G. K. FLOWER.
Horseshoe-Calk.
No. 215,054.   Patented May 6, 1879.
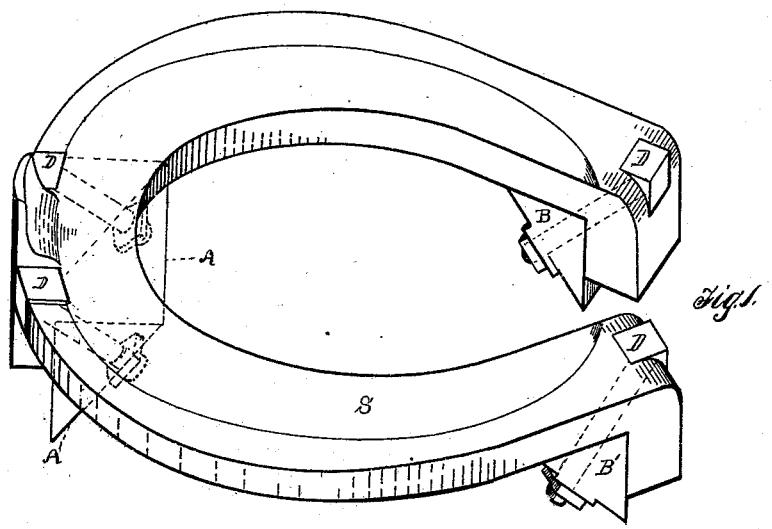
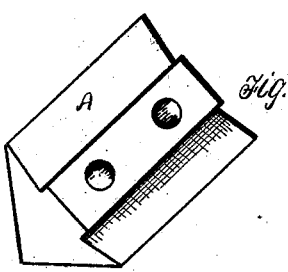
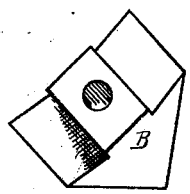
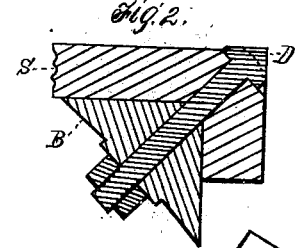
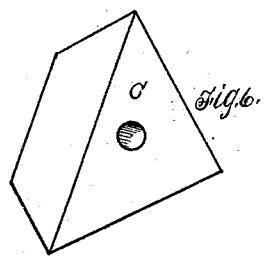
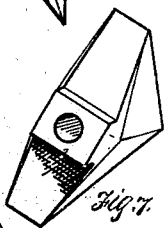
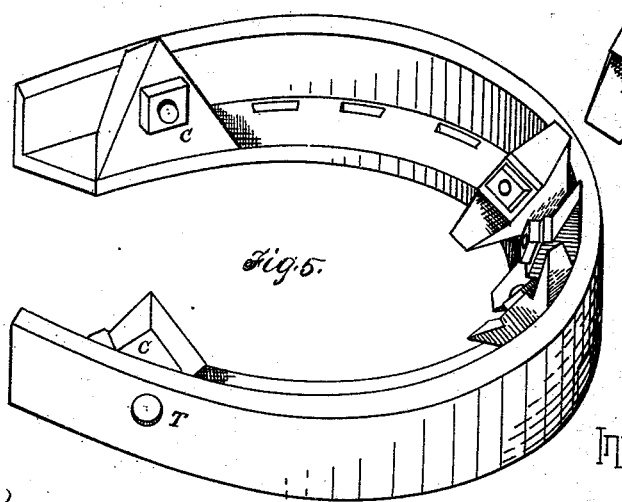
WITNESSES.
INVENTOR
George King Flower

UNITED STATES PATENT OFFICE.

GEORGE K. FLOWER, OF PITTSBURG, PENNSYLVANIA.

IMPROVEMENT IN HORSESHOE-CALKS.

Specification forming part of Letters Patent No. 215,054, dated May 6, 1879; application filed January 29, 1879.

*To all whom it may concern:*

Be it known that I, GEORGE KING FLOWER, of the city of Pittsburg, county of Allegheny, and State of Pennsylvania, have invented a new and useful Improvement in Horseshoe-Calks, which improvement is fully set forth in the following specification, reference being had to the accompanying drawings, in which—

Figure 1 is a perspective view of a shoe with ordinary toe and heel calks, and the adjustable calks attached thereto with bolts passing obliquely through the shoe. Fig. 2 is a sectional view of the same at B, showing prism-headed bolt attaching adjustable calk to shoe in a diagonal or oblique line of direction. Fig. 3 is a detached perspective view of adjustable toe-calk with two parallel cylindrical holes to correspond with the two oblique holes in shoe at A, Fig. 1; Fig. 4, view of adjustable calk with one cylindrical hole. Figs. 5, 6, and 7 are illustrations of readjustable calks, rectangular and triangular, modified to suit peculiarity of shape of shoe.

The object of the invention is to provide for attachment to horseshoes adjustable calks, that are readjustable in inverted positions, so that when one portion has become worn so as to be unserviceable another part may be used in its place.

To this end the calks A, B, and B', each having two sides alike in form and size, or the calk C, having three sides or bearings alike in form and size, are attached to the shoe by means of a bolt or screw, or combination of bolt and screw.

The calks made of steel or iron are drilled, pierced, or cast with a cylindrical hole in each, so directed and located that it forms a central axis common to and equidistant from the several wearing edges or points of each.

A corresponding hole having been made in the shoe, the bolt or screw is passed first through the shoe, and then through the adjustable calk, which in some instances may be threaded for the screw, and either by means of this screw or a nut on the end of the bolt the parts are drawn firmly together and secured by slightly riveting or by a nut-lock.

In this manner the equilateral triangular calk C is screwed or bolted endwise against and to the permanent calk or flange of the shoe, each of the three equiangular sides or bearings of this adjustable calk resting alternately against the lower surface of the shoe, and each of the three wearing points or edges used in turn.

The right-angled triangular calk B, having two sides or bearing-surfaces alike in form and size, is fastened to the shoe by the same means, but in a different line of direction, either of the two sides or bearing-surfaces resting, one against the lower surface of the shoe and the other against the permanent calk or flange of the shoe, and the screw or bolt passing obliquely through the shoe at this junction of the permanent calk or flange of the shoe with the main plate or body of shoe, as at Fig. 2. Thus the adjustable calk last described is drawn by one bolt against two bearing-surfaces of the shoe, and but one cylindrical hole in the adjustable calk is required for either of the positions in which it may be used.

A great advantage is obtained by the mode of fastening by bolt passing obliquely through the shoe as described, the wearing down of the shoe without the use of the adjustable calk being no detriment to the subsequent use and adjustment of the calk, while this is not the case where the hole is pierced through the permanent calk of the shoe, as at T, Fig. 5.

The adjustable calk A, Fig. 1, is provided with two parallel cylindrical holes, which, in reversing the calk, are used alternately with the two corresponding holes passing obliquely through the shoe at the toe.

A prism-headed bolt is used where the holes are drilled obliquely through the shoe, so that the head of the bolt when countersunk will present no projection, either on the outer or upper surfaces of the shoe.

Holes may be drilled obliquely in the shoe while upon the horse's foot, using a flexible drill; or the shoe may be prepared for the adjustable calks before it is nailed to the hoof.

The readjustable calks described are suitable for winter use, and afford a safe, cheap, and expeditious mode of sharpening horseshoes without removing the shoes from the feet; but blunt or dull-edged calks may be used at other seasons to save wear of shoes.

I claim as my invention—

The combination, with a horseshoe having calks integral therewith, of reversible double-pointed supplementary calks fitted to the bottom of the shoe and the inner surface of the integral calks, and held in place by screw-bolts inserted obliquely to the plane of the shoe, as and for the purpose set forth.

GEORGE KING FLOWER.

Witnesses:
FRANK M. CULBERT,
FRANK C. McCRORY.